(No Model.)
B. S. SEAMAN.
BICYCLE SADDLE.
No. 549,466. Patented Nov. 5, 1895.
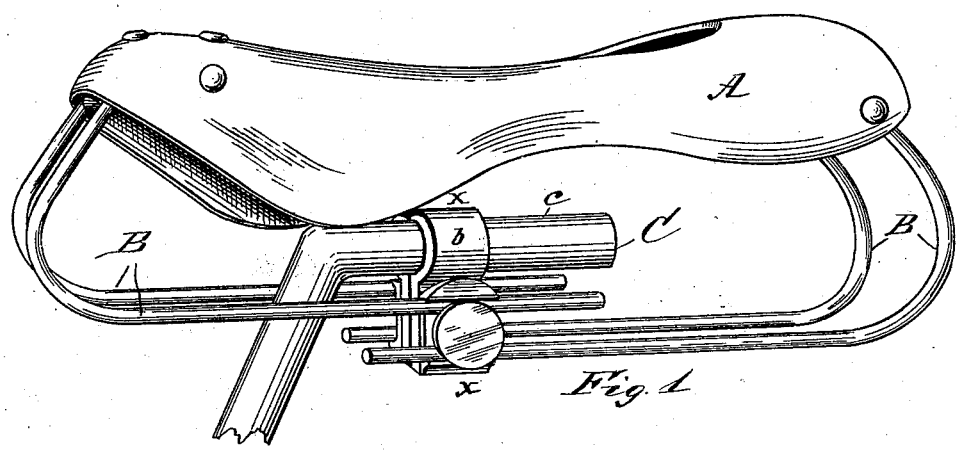
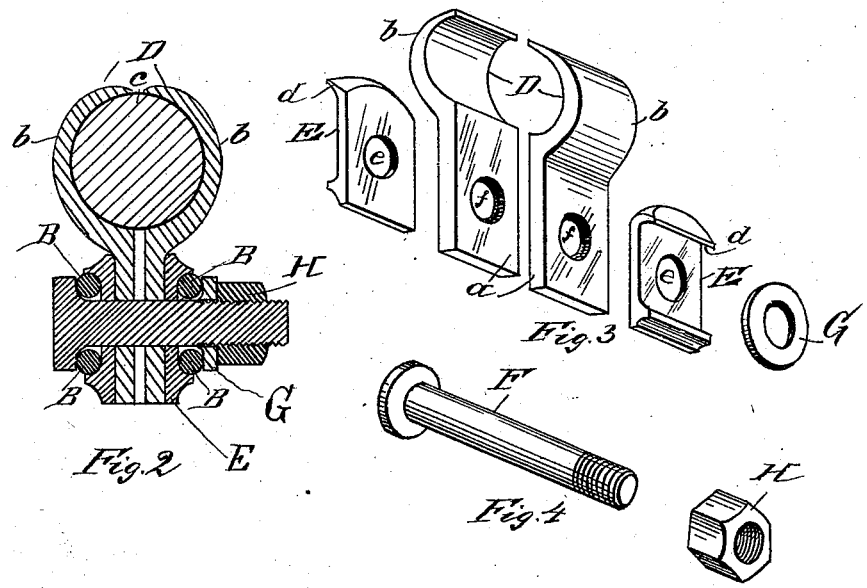
WITNESSES
INVENTOR
Benjamin S. Seaman
By W. K. Miller
Attorney

UNITED STATES PATENT OFFICE.

BENJAMIN S. SEAMAN, OF CANTON, OHIO, ASSIGNOR TO THE GILLIAM MANUFACTURING COMPANY, OF SAME PLACE.

BICYCLE-SADDLE.

SPECIFICATION forming part of Letters Patent No. 549,466, dated November 5, 1895.

Application filed November 9, 1894. Serial No. 528,290. (No model.)

*To all whom it may concern:*

Be it known that I, BENJAMIN S. SEAMAN, a citizen of the United States, and a resident of Canton, county of Stark, State of Ohio, have invented a new and useful Improvement in Bicycle-Saddles, of which the following is a full, clear, and exact description, reference being had to the accompanying drawings, making part of this specification.

My invention relates to improvements in bicycle-saddles; and it consists of certain features of construction and combination of parts, as hereinafter described and claimed.

Figure 1 of the accompanying drawings is a view in perspective of my invention. Fig. 2 is a section through from $x$ to $x$. Fig. 3 is a perspective of the clamps and washers comprising the holder. Fig. 4 is a similar view of the binding bolt and nut.

A represents the saddle, B the springs, and C the saddle-post. The clamps D are formed substantially as shown, having a body portion with parallel sides $a$ and a circular portion $b$ to grasp the horizontal portion $c$ of the support C, substantially as shown in Figs. 1 and 2.

Spring-holding washers E are provided, having outwardly-facing curved projections $d$ at their upper and lower edges, which grasp the springs B, and central apertures $e$, corresponding with apertures in the clamps B.

The parts are assembled as follows: Place the clasps together, circular portions facing on the outside of body portion, place the washers E as shown in Fig. 2, pass the bolt F through the aperture provided, pass the washer G on the bolt, and turn on the nut H. The ends of the springs B are passed through the space provided therefor, between the head of the bolt and the circular portion of the washer on one side and on the other side between the circular portion of the washer E and the washer G, the nut H turned on the bolt to bind the parts together. The post C is passed through or into the clasp and the nut turned on to secure the parts in desired adjustment.

To stretch the saddle the nut H is slacked or turned back to release the springs, which may then be drawn apart and the nut turned on to secure them; and to tip the saddle the nut is turned back a distance to allow the washers E to turn on the bolt, when the nut will be turned back to tighten or secure the saddle in desired adjustment. By this construction the springs B are adjustable longitudinally independently of the adjustment of the clamping devices on the saddle-post.

Having thus fully described the nature and object of my invention, what I claim is—

The combination with a saddle post and seat, of the longitudinally adjustable springs, the clamps, D, provided with upper, circular or curved portions adapted to grasp the saddle post, and lower, perforated portions, washers, E, and a securing bolt, substantially as and for the purposes described.

In testimony whereof I have hereunto set my hand this 10th day of October, A. D. 1894.

BENJAMIN S. SEAMAN.

Witnesses:
W. K. MILLER,
CHAS. R. MILLER.